United States Patent [19]

Ruscitti et al.

[11] 4,228,931

[45] Oct. 21, 1980

[54] MANUALLY OPERATED PUMP FOR DISPENSING MICRONIZED LIQUIDS AT A PREDETERMINED PRESSURE

[75] Inventors: Tommaso Ruscitti; Giovanni Albini; Roberto Torretta, all of Milan, Italy

[73] Assignee: ADM S.p.A., Milan, Italy

[21] Appl. No.: 2,767

[22] Filed: Jan. 11, 1979

[30] Foreign Application Priority Data

Feb. 9, 1978 [IT] Italy .......................................... 20110

[51] Int. Cl.[2] .............................................. G01F 11/36

[52] U.S. Cl. ..................................... 222/321; 239/333

[58] Field of Search ................ 417/550, 566; 239/324, 239/331, 333; 222/320, 321, 383, 385

[56] References Cited

U.S. PATENT DOCUMENTS

| | | | |
|---|---|---|---|
| 3,500,761 | 3/1970 | Clevenget et al. | 222/321 |
| 3,774,849 | 11/1973 | Boris | 222/321 |
| 4,029,261 | 6/1977 | Olegnowicz | 222/385 |
| 4,113,145 | 9/1978 | Meshberg | 222/321 |

FOREIGN PATENT DOCUMENTS 2097353 2/1972 France .

*Primary Examiner*—H. Grant Skaggs
*Attorney, Agent, or Firm*—Oblin, Fisher, Spivak, McClelland & Maier

[57] ABSTRACT

Pump that can be applied on a container and manually operable to deliver or dispense a liquid in an atomized form. The pump comprises a hollow stem for liquid delivery or dispensing, on which a sealing gasket is mounted and downward urged by a spring. A groove communicating through holes with the cavity of the stem is provided on the lower end of the latter. The gasket, normally sealing on the stem below said groove, when upward moved upon operation of the pump, has its lower edge suddenly bent inwardly of the groove, when arriving thereat, thus suddenly and completely communicating the passage of the pressure liquid to said holes of the stem.

2 Claims, 3 Drawing Figures

MANUALLY OPERATED PUMP FOR DISPENSING MICRONIZED LIQUIDS AT A PREDETERMINED PRESSURE

This invention relates to a manually operated pump for dispensing micronized liquids at a predetermined pressure.

Many types of manually operated pumps that can be applied to liquid containers are known which, when manually operated, will deliver the liquids in micronized or atomized form.

However, the simplest types of these pumps have the disadvantage that the atomization of the delivered liquid and the pressure at which the liquid outflows from the nozzle of the delivering cap applied to the pump depends on the operating speed of the pump and pressure manually exerted thereon.

The French Patent Specification No. 2,097,353 describes a manually operated pump which is so constructed that the liquid delivery occurs only upon reaching a predetermined minimum pressure. Such a pump comprises a shutter movable against the bias of a spring, which shutter covers a hole for the passage of liquid to the delivering cap and lifts off from such hole only after imparting a predetermined pressure to the liquid contained within a pressure chamber forming part of the pump. Under inoperative or rest conditions, the shutter seals on an abutment integral with the moving stem forming part of the pump. When, after reaching the pressure overcoming the resisting bias of the spring on the shutter, the latter lifts off from its sealing abutment, a very small passage is initially opened, through which the pressurized liquid slowly outflows, and then, at a decayed pressure, dripping outwardly of the nozzle of the delivering cap, thereby not being micronized or atomized as it would be desirable. Thus, the pressure of the liquid within the pressure chamber rapidly decreases and finally the delivery is quite unsatisfactory under the standard conditions for using the manually operated pump, an optimum micronization or atomization being attainable only if the pump is quickly operated by a large force.

As above mentioned, the fault or defect in such a manually operated pump and other similar pumps, consists in that the shutter when being moved very slowly and gradually opens the passage for the outflow of the pressure liquid from the inner chamber to the valve towards the delivery nozzle.

It is the main object of the present invention to provide a manually operated pump of a simple structure and low cost of production, which can deliver a pressure liquid in an atomized form under standard use conditions, avoiding the situation where such a liquid is delivered in the form of droplets falling down along the delivering nozzle and which are accordingly unusable.

These and still further objects are accomplished by a manually operated pump for manual dispensing of liquids at a predetermined pressure, comprising a main hollow body or housing, a movable stem partially extending into the cavity of said body or housing and projecting therefrom the support a delivering cap, a spring operating between said body or housing and said stem to hold the latter forced out of said chamber against a stop member, a shaped seal or gasket moving within said body or housing cavity and sealing on the inner surface of the cavity and on the stem to define a pressure chamber with said body of housing, a port or aperture in the bottom of said hollow body or housing and at which a one-way valve comprising a sealing ball accomodated within a suitable seating is positioned, a spring operating between a finger or tooth projecting from the stem and the seal or gasket to hold the latter urged or forced against said valve and, under inoperative or rest conditions, against a stop edge or rim of the stem, a stop step in the hollow body or housing to stop said seal or gasket before the lower stop of the plunger, said stem having a cavity partially passing therethrough and open at the free end of the stem externally of the hollow body or housing, and respectively at least one substantially radial hole in the stem wall just above said stop edge or rim of the stem. The said substantially radial hole of the stem opens in a comparatively large and deep annular groove formed throughout the stem periphery, and the shaped seal or gasket is superimposed on the groove and seals on the stem by a substantially cylindrical tubular extension with free edge facing the stem end internally of the cavity of the main body or housing, said seal or gasket being made of resiliently deformable material and the thickness of the tubular extension being such that under the push of the pressure fluid in said pressure chamber the free edge of the tubular extension is bent inwardly of the annular groove, leaving a completely free passage for the fluid to said substantially radial hole of the stem.

In order that the structure and features of the manually operated pump be more clearly understood a preferred embodiment thereof will now be described by way of unrestrictive example with reference to the accompanying drawings, in which.

Figure 1:
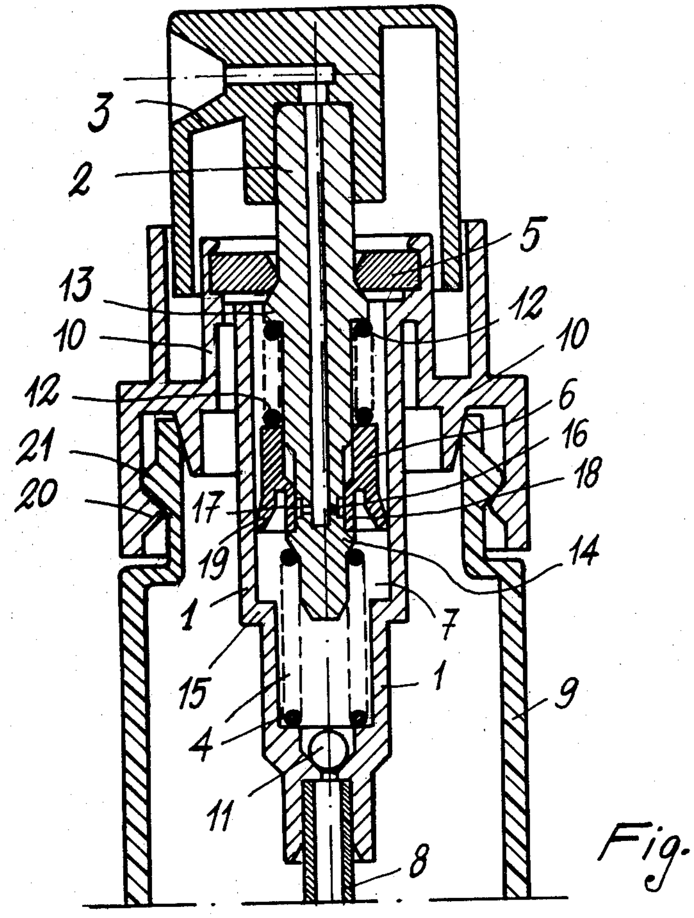
FIG. 1 is an axial sectional view of the pump as applied to a container under its inoperative or rest conditions.

The pump shown in the figures of the accompanying drawing comprises a main hollow body 1, a stem 2 partly extending into the cavity of body 1 and projecting therefrom to support a delivering cap 3, a spring acting between body 1 and stem 2 to hold the latter forced out of said chamber against a stop and sealing gasket 5 integral with said body 1. A shaped gasket 6 movable within the cavity of body 1 and sealing on the inner surface of the cavity and on stem 2, such a shaped gasket 6 defining with said body 1 a pressure chamber 7, the function of wich will be explained in the following.

A port or aperture is provided on the bottom of body 1, that is on its portion which in the figures of the accompanying drawing is shown at the bottom, this port or aperture having mounted therein a drawing tube 8 immersed in the liquid contained in a container 9, on which the valve is mounted through a ring nut or head 10 integral with the valve. At this port or opening of body 1, a seating is provided and accomodates therein a floating ball 11 acting as a one-way valve, as it allows the liquid to move from the container into the interior of pressure chamber 7, while not allowing the liquid to outflow from chamber 7 when being compressed, which will also be later explained. The valve also comprises a spring 12 acting between a tooth or finger 13 projecting from the stem and said seal or gasket 6, to hold the latter urged or forced downwardly, that is towards said ball 11, under the inoperative or rest conditions of the valve, said seal or gasket being stationary or fixed against a stop edge 14 projecting from the lower end of stem 2.

Said main body 1 of the valve is so shaped as to have at its lower end a stopping step 15 designed to stop the downward movement of said seal or gasket 6 prior to downard movement of stem 2 being stopped, and to enable the pump to be primed at the beginning of its use. As it will be seen from the figures of the accompanying drawings, an axial hole passes through the major part of the length of stem 2, this hole opening at the free end of the stem outwardly of sealing gasket 5 and, respectively, at two radial holes 16 provided on the wall of the stem just above edge 14 and at said shaped seal or gasket 6.

Figure 2:
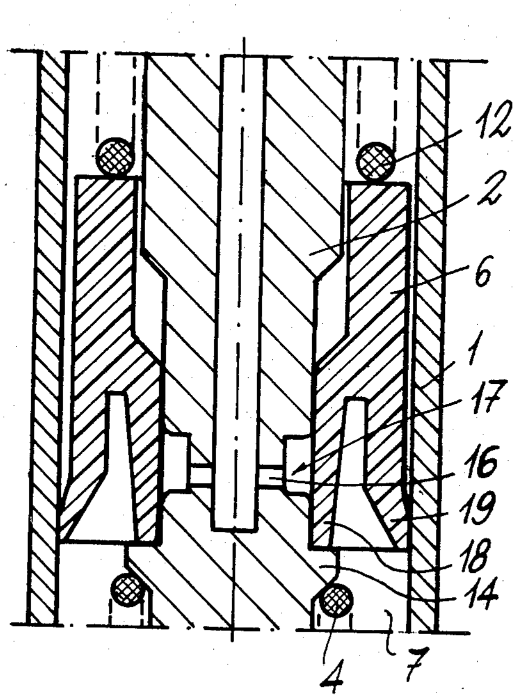
FIG. 2 is an enlarged fragmentary sectional view of the pump under the same conditions of FIG. 1.
Figure 3:
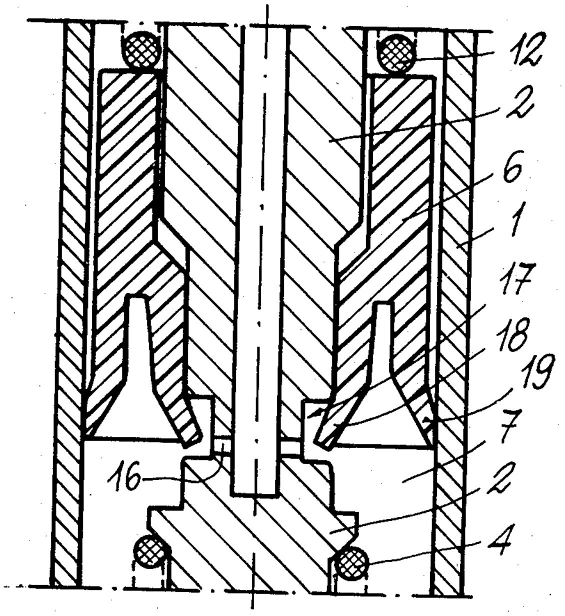
FIG. 3 is also an enlarged fragmentary sectional view of the pump under conditions of delivery of pressurized liquid.

It is the basic structural characteristic of the pump hitherto described that said radial holes 16 provided in the stem open outwardly at an annular groove 17 which is formed all about the stem, such a groove being of comparatively large and deep demensions, as clearly shown by FIGS. 2 and 3.

It is also a determinant characteristic that said shaped seal or gasket 6 comprises a tubular extension 18 sealing on a cylindrical portion of stem 2 and a shaped tubular portion 19, externally of said tubular portion 18, by which sealing is carried out on the cylindrical wall of body 1.

Seal or gasket 6, and particularly said tubular sealing extensions 18 and 19 are made of a resiliently deformably material, and the thickness of tubular extension 18 is such that the latter can become deformed due to the pressure of the liquid in the pressure chamber 7, when the pump is operated.

The main hollow body 1 of the valve is made in only one piece by a single molding operation, with a ring nut or head 10 having an inwardly projecting annular rib 20, which is snap connected on an annular rib 21 outwardly projecting from the opening or mouth of container 9, to assure in a simple and economical manner the fixing of the pump on container 9 holding the liquid intended to be dispensed. Assuming at the conditions of inoperation or rest shown in FIG. 1. Exerting by a finger a downard pressure on cap 3, stem 2 is lowered, downwardly driving said seal or gasket 6 through the action of spring 12. Since at this initial stage of the pump operation only readily compressible air is present in pressure chamber 7, the downward movement of seal or gasket 6 is continued (compressing the air in chamber 7, as said seal or gasket 6 maintains holes 16 in closed state), so that for some distance stem 2 and seal or gasket 6 contemporary move downward. At some point of this downward movement, seal or gasket 6 will stop against step 15 of body 1, whereas the stem may continue its downward movement. Under these conditions, the air that had been compressed within chamber 7 (and which, prior to the stop of seal or gasket 6, could not outflow to the outside as prevented from by said seal or gasket, and to the inside as prevented from by ball 11), passes through holes 16 and axial hole of stem 2 to be outwardly exhausted. From this point, when the stem is allowed to move up again, first the stem is upwardly moved until its edge 14 contacts with said seal or gasket 6, thus closing the outlet or exhaust holes 16, whereupon the seal or gasket and stem simultaneously upwardly move, increasing the volume of chamber 7 and accordingly providing a suction therein which induces the liquid within the container 9 to move in an upward direction through said drawing tube 8 and ball 11, the later being upward lifted. Thus, the pump can be readily and safely primed and its pressure chamber 7, when the pump is restored to the inoperative or rest conditions shown in FIG. 1, will be thereby filled with liquid, the return of which into container 9 is prevented by said ball 11.

From these conditions shown in FIG. 1 and in enlarged scale and fragmentarily in FIG. 2, assume that delivering cap 3 is again depressed for causing stem 2 to be lowered.

In a first step of the lowering movement, the stem will cause the compression of spring 12 and said shaped seal or gasket 6 cannot be lowered since the liquid in said pressure chamber 7 is incompressible, therefore preventing the movement thereof. On continued lowering of the stem, at some point the lower edge of the tubular portion 18 of said shaped seal or gasket 6 will arrive at the lower edge defining said annular groove 17.

Since, as above stated, the material by which said seal or gasket 6 is made is resiliently yieldable and the dimensions of the tubular portion 18 are provided so that it can freely be deformed due to the liquid pressure within chamber 7, as soon as the edge of tubular portion 18 passes the lower edge defining said annular groove 17, said portion will be suddenly deformed inwardly of annular groove 17, as clearly shown in FIG. 3.

Thus, a passage of relatively large section will be suddenly opened, such as to allow a free outflow of pressure liquid from chamber 7 to radial holes 16 and hence to the axial hole of the stem, whereupon and through the nozzles of delivering cap 3 the liquid will be suddenly delivered at a predetermined pressure (depending on the pressure or force of spring 12). Such an outward delivery of the liquid will occur in a quite micronized or atomized form and it would be impossible to form drops of liquid at the nozzle of the delivering cap, as it occurs in the known type of manually operated pumps. It is important to repear the fact that, as soon as the lower edge of tubular portion or wall 18 has passed the lower edge defining said annular groove 17, a small passage of a section gradually increasing as the stem is lowered does not opens, but such a passage suddenly becomes of a large section to enable the liquid to suddenly outflow in a considerable amount from chamber 7 to the atomizing nozzle. Now, similarly to the known type of manually operated pumps, even if the stem lowering should be manually brought to a stop, butsuch a stem is maintained downward compressed, the delivery or dispensing would be continued at a constant pressure until said shaped seal or gasket 6 has been lowered through said spring 12 to come to stop on said stop tooth or finger 14 of the stem.

Thus, by a valve of extremely simple and low cost structure, all of the drawbacks of the prior art manually operated pumps are overcome. That is the dripping (instead of pressurized atomization) of the liquid outside of the nozzles for said delivering cap 3 would be prevented.

What is claimed as new and desired to be secured by Letters Patent of the United States is:

1. A manually operable pump for dispensing atomized liquids at a predetermined pressure, comprising:

a hollow body having a top end and a bottom end, said bottom end including a one way valve for permitting liquid only to enter the cavity of said body, said hollow body including a stop edge on the surface of the cavity of said body intermediate said top and bottom end;

a stem having a first end normally in said hollow body and second end extending out of said top end of said hollow body, said stem including a longitudinal bore extending from said second end to adjacent said first end, said stem also including a first stop edge and a second stop edge intermediate said first stop edge and said second end;

an annular shaped gasket surrounding said stem, said gasket sealing said cavity, said gasket also including a substantially cylindrical tubular extension of resiliently deformable material, said extension having a bottom edge and closely surrounding said stem;

a first spring connected between said body and said stem and operable to bias said stem out of said top end of said body;

a second spring connected between said second stop edge of said stem and said gasket and operable to bias said bottom edge of said tubular extension against said first stop edge of said stem;

a circumferential annular groove on the surface of said stem adjacent said first end and normally surrounded by said tubular extension, said groove having a bottom edge; and at least one radial bore in said stem, each said at least one radial bore extending from a portion of said longitudinal bore adjacent said first end of said stem to said annular groove, whereby when bottom edge of said tubular extension uncovers said bottom edge of said groove, the pressure in said body cavity deforms said tubular extension into said groove to fully communicate said body cavity with said at least one radial groove.

2. The pump of claim 1 wherein said gasket includes a tubular sealing portion located radially outward of said tubular extension, said tubular sealing portion contacting the surface of said cavity.

* * * * *